United States Patent Office 3,030,249
Patented Apr. 17, 1962

3,030,249
POLYURETHANE COATED ARTICLES
Charles S. Schollenberger and John F. Jones, Cuyahoga Falls, Ohio, assignors to The B. F. Goodrich Company, New York, N.Y., a corporation of New York
No Drawing. Filed Mar. 17, 1958, Ser. No. 721,655
20 Claims. (Cl. 154—43)

This invention relates to articles coated with polyurethanes and more particularly pertains to structures strongly bonded to polyurethanes by means of a primer layer comprising a partial ester of a linear polyacrylic acid anhydride and the method for preparing said articles.

Polyurethanes are well known in the art. The most common polyurethanes are ordinarily prepared by the reaction of a polyester, a polyesteramide or a polyether glycol with a polyisocyanate, often with other reaction additives such as water as described in U.S. Patents 2,620,-516, 2,621,166, 2,625,531, 2,625,532, 2,625,535, 2,692,-873, 2,692,874 and 2,702,797. The vulcanized polyurethanes have high tensile strengths, are exceedingly resistant to abrasion, and are resistant to oxidation and many solvents. Because of these properties it is desirable to make use of these materials as coating agents for leather, wood, metals, ceramic materials and glass. Such coated articles are useful in many applications including structural materials, decorative articles, packaging, wearing apparel and the like.

Polyurethanes adhere quite well to a variety of materials. However, the adhesion of polyurethanes to many surfaces, especially those which are hard and impervious, is not readily accomplished without the use of special conditions such as heat, pressure and the use of additional diisocyanate. The lack of suitable methods for adhering polyurethanes to metal, ceramic and glass surfaces have been some of the major deterrents to more widespread use of these valuable materials.

The primary object of this invention is the provision of strongly bonded composite structures comprising a polyurethane and a dissimilar surface such as metal, leather, wood, ceramic and glass and intercalated therebetween a primer comprising a partial ester of a linear polyacrylic acid anhydride. Another object of this invention is the provision of a method for making said composite structures.

The objects of this invention are accomplished through the use of a partial ester primer composition comprising a partial ester of a linear acrylic acid anhydride polymer, said partial ester serving to bond or tie the polyurethane to the metal, leather, wood, ceramic or glass surface, by a mechanism which is not completely understood, so as to result in a composite structure having improved shock resistance, abrasion resistance and weather aging properties.

The term "partial ester primer" as used in this invention is defined to mean a partial ester of a linear acrylic acid anhydride polymer substantially composed of the unit structure.

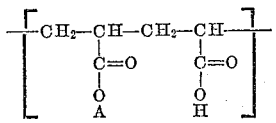

wherein A represents a hydrocarbon radical having from 1 to 12 carbon atoms and preferably from about 20 to 100% of the acid anhydride groups are converted to the partial ester derivative.

The partial esters embodied in this invention can be prepared by the reaction of linear polyacrylic acid anhydride with primary or secondary aliphatic alcohols or a phenol each of which is free of primary or secondary amine groups. Unsaturated alcohols can be used as well as saturated alcohols. The reaction is preferably carried out in an inert diluent such as a liquid hydrocarbon or halogenated hydrocarbon in which the alcohol is soluble, in the presence of a trace of a tertiary amine, such as pyridine or triethyl amine, at a slightly elevated temperature of from about 50 to 100° C. The reaction will proceed at room temperature but the rate is too slow for practical purposes.

Specific alcohols useful for preparation of the partial esters are methanol, ethanol, n- and secondary propanols, n- and secondary butanols, n- and secondary pentanols, n- and secondary hexanols, n- and secondary heptanols, n- and secondary octanols, n- and secondary nonanols, n- and secondary decanols, n- and secondary dodecanols, alicyclic alcohols such as cyclopentanol and cyclohexanol, heterocyclic alcohols such as furfuryl alcohol and tetrahydrofurfuryl alcohol. Aromatic alcohols include phenol, cresols, alpha- and beta-naphthols and the like. Other alcohols which contain substituents which are non-reactive with the acid anhydride linkages, such as acid or tertiary amino groups, include dimethyl amino ethanol, diethyl amino ethanol, dipropyl amino ethanol, dibutyl amino ethanol, 2-chloroethanol, 2-bromoethanol, beta-hydroxy propionic acid, monoalkyl ethers of ethylene glycol, 3-nitropropanol, and other alcohols which have neither a primary nor secondary amino group. Other suitable partial esters are described in the copending U.S. patent application of John F. Jones, Harold Tucker and Lawrence O. Arnold, Serial No. 724,889, filed March 31, 1958, now Patent No. 3,005,785.

One method of preparing linear acid anhydride polymers comprises polymerizing glacial acrylic acid or substituted derivatives thereof in the presence of an inert diluent, such as benzene, and an excess of a dehydrating agent such as acetic acid anhydride, in the presence of catalytic amounts of a free-radical polymerization catalyst at a temperature of about 50° C. to about 70° C. The linear polyacrylic acid anhydrides which are useful in making the partial ester primers of this invention are prepared in the manner described and more fully claimed in the copending U.S. patent application Serial No. 555,-308, filed December 27, 1955, by John F. Jones.

The polyurethanes most useful in this invention include the polyesterurethanes and the polyetherurethanes.

The polyesterurethanes are those high molecular weight products which result when linear polyesters containing reactive hydroxyl end groups such as those which result from the esterification-condensation of a dicarboxylic acid or its acid anhydride with an excess of a glycol are transformed into higher molecular weight polymers by the reaction of their terminal hydroxyl groups with diisocyanates. The aforementioned polyesters which have utility in the present invention are more specifically defined as those which are prepared by the esterification-condensation of at least one type of dicarboxylic acid or its acid anhydride conforming to the structure

wherein R represents a hydrocarbon group having from 1 to 12 carbon atoms. Representative acids of this class include malonic, succinic, glutaric, adipic, pimelic, sebasic, suberic, azelaic, maleic, itaconic, phthalic, terephthalic and isophthalic and the like with a glycol conforming to the structure HO—R'—OH wherein R' is a hydrocarbon group having from 2 to 12 carbon atoms, such glycols including ethylene glycol, propylene glycol, trimethylene glycol, tetramethylene glycol, butenediol, butynediol, pentamethylene glycol, hexamethylene glycol, cyclohexylene glycol, heptamethylene glycol, octamethylene glycol, o-, m-, and p-xylylene glycols and the like and others. The preferred polyesters for the purpose of this invention are those which result from the condensation of adipic acid and phthalic acid with alkylene glycols such as ethylene glycol, propylene glycol, trimethylene glycol, tetramethylene glycol and neopentylene glycol.

The polyether glycols useful in this invention are those which are derived from alkylene oxides, glycols or from heterocyclic ethers and they may be represented by the formula $HO(R''O)_nH$ in which $R''$ is an alkylene radical having from 2 to 12 carbon atoms and $n$ is a number greater than 1. As is true in the case of the polyesters, it is not necessary that all of the alkylene radicals be the same in a given polymer and polyether glycols containing a mixture of radicals may be employed. Also useful are polyarylene ether glycols in which $R''$ alone is an arylene radical and polyarylene-alkylene ether glycols such as polyethylene-phenylene ether glycol or mixtures thereof with polyalkylene ether glycols. The preferred polyether glycols are the polyethylene glycol, the polypropylene glycol and the polybutylene glycols.

The molecular weights of the polyester glycols, polyesteramides and polyether glycols embodied in this invention can vary between 150 and 10,000 with the preferred range having the limits of 400 to 4,000. The acid numbers of the polyester glycols and polyesteramides embodied in this invention are always less than 10 and preferably less than 4.

The polyisocyanates which are most useful for producing the polyether and polyesterurethanes and polyesteramides embodied in this invention are those which conform to the structure $OCN-R'''-NCO$ wherein $R'''$ is a hydrocarbon group having from 2 to 14 carbon atoms. The preferred diisocyanates for the purposes of this invention are aromatic diisocyanates such as tolylene-2,4-diisocyanate, ortho-, meta- and para-phenylene diisocyanate, naphthalene-1,5-diisocyanate, diphenylmethane-p,p'-diisocyanate and mixtures thereof and the like. The reaction between polyether glycols, polyesteramides and polyester glycols and the aromatic diisocyanates, of course, may be conducted in the presence of minor amounts of other materials including water and acidic substances, as is well known.

The polyurethane coated articles of this invention are most conveniently prepared by the application of a cement of the partial ester primer on the surface of the metal, leather, wood, ceramic or glass structure and removal of the solvent from the cement film by evaporation prior to the application of the polyurethane coating. The partial ester primer cement may be made by dissolving the partial ester primer in a suitable low-boiling organic solvent such as methanol, ethanol, propanol, butanol, acetone, methyl ethyl ketone and the like. The polyurethane may be applied to the primed surface of the metal, leather, wood, ceramic or glass structure by coating from a cement of the polyurethane in a suitable solvent such as benzene, toluene or methyl ethyl ketone onto the primed surface followed by evaporation of the solvent, or a polyurethane structure or polyurethane foam structure may be applied to said primed surface with slight heat and pressure. The solid partial ester primer may also be applied to either the solid polyurethane surface or the surface of the metal, leather, wood, ceramic or glass with heat and pressure prior to the formation of the polyurethane coated articles. The use of liquid casting or liquid foaming polyurethanes on the primer surface permits cast- or foamed-in-place coatings. When a relatively thin protective or decorative coating of polyurethane alone is required, the polyurethane cement method of producing the coated articles is preferred because no extraneous heat or pressure is required.

The following examples are specific illustrations and not limitations on the scope of this invention. The amounts of ingredients used in the following examples are expressed as parts by weight unless otherwise specified.

*Example I*

A polyesterurethane cement was prepared by heating and stirring a mixture of 267 g. of hydroxyl-containing polyethylene adipate of 1396 molecular weight in 615 ml. of dry benzene and part of the benzene was then distilled off. The residue was then cooled slightly and 61 g. of p-phenylene diisocyanate were added. The mixture was then stirred and heated at reflux for 45 minutes longer and the product was recovered as a fluid, homogeneous amber liquid. This cement was used in some of the following examples.

*Example II*

The surface of each of a number of base materials was swabbed with a cotton dampened with carbon tetrachloride prior to being painted with a 10% solution of a partial n-butyl ester of linear polyacrylic acid anhydride in which approximately 100% of the acid anhydride groups were converted to the partial butyl ester in n-butanol. The surface was then dried at 107° C. for one hour and a smooth continuuous film of the polyesterurethane cement described in Example I was coated on the partial ester primer treated surface. The resulting articles were dried at 50% humidity and 75° F. for 20 hours. The properties of these structures are listed below:

| Base Material | Polyurethane-to-Base Material Bond Adhesion | Abrasion Resistance |
| --- | --- | --- |
| Polychloroprene gum | Fair | Excellent. |
| Natural rubber gum | do | Do. |
| Polybutadiene-acrylonitrile gum | do | Do. |
| Plywood | Integral bond | Do. |
| Steel | Excellent | Do. |
| Copper | do | Do. |
| Aluminum | do | Do. |
| Leather | Very good | Do. |
| Ceramic tile (unglazed) | Excelent | Do. |
| Plate glass | Very good | Do. |

From these results it is apparent that very good adhesion of polyurethane polymer is obtained even on non-porous, smooth surfaces.

*Example III*

The procedure described in Example II was followed with the substitution of a 10% solution of a partial ethyl ester of linear polyacrylic acid anhydride in ethanol in place of the partial n-butyl ester. Approximately 100% of the acid anhydride groups in the parent acid anhydride polymer were converted to the half ethyl ester.

| Base Material | Polyurethane-to-Base Material Bond Adhesion | Abrasion Resistance |
| --- | --- | --- |
| Polychloroprene gum | Fair | Excellent. |
| Polybutadiene-acrylonitrile gum | do | Do. |
| Plywood | Integral bond | Do. |
| Steel | Excellent | Do. |
| Copper | do | Do. |
| Aluminum | do | Do. |
| Ceramic tile (unglazed) | do | Do. |
| Plate glass | do | Do. |

Control samples to match the above structures were made without the use of the partial ethyl ester of polyacrylic acid anhydride primer. In all cases the polyurethane-to-base material bond adhesion was inferior to the adhesions tested above. The adhesion of the polyurethane to unprimed steel, copper, aluminum, ceramic tile and plate glass was particularly poor.

*Example IV*

The procedure described in Example II was followed with the substitution of a 10% solution of the partial allyl ester of linear polyacrylic acid anhydride in acetone for the partial n-butyl ester. Approximately 50% of the acid anhydride groups in the parent acid anhydride polymer were converted to the partial allyl ester.

| Base Material | Polyurethane-to-Base Material Bond Adhesion | Abrasion Resistance |
|---|---|---|
| Polybutadiene-acrylonitrile gum | Fair | Excellent. |
| Plywood | Integral bond | Do. |
| Steel | do | Do. |
| Copper | do | Do. |
| Aluminum | do | Do. |
| Leather | do | Do. |
| Ceramic tile (unglazed) | do | Do. |
| Plate glass | Very good | Do. |

*Example V*

A polyetherurethane which was prepared from a 5:2 weight ratio of polypropylene glycol of 2,000 molecular weight and tolylene diisocyanate was foamed in place upon the surface of base materials which were primed with the partial n-butyl ester of linear polyacrylic acid anhydride and on the surface of unprimed base materials (control). The foams were prepared by adding a mixture of 2.5% by weight of water, 1.5% by weight of n-methyl morpholine and 0.5% by weight of triethyl amine to the above-mentioned polyetherurethane. The adhesion of the foams to the base material is described below:

| Base Material | Adhesion (Primed Surface) | Adhesion (Control) |
|---|---|---|
| Unglazed ceramic tile | Excellent | Poor. |
| Plate glass | do | Fair. |
| Glazed ceramic tile | do | Do. |

When polyacrylic acid anhydride is partially esterified with other alcohols having from 1 to 12 carbon atoms good adhesion of polyurethanes to dissimilar surfaces including those mentioned above is effected by following the procedures of the specific examples.

The above descriptions and examples are intended to illustrate the nature of this invention the scope of which is defined by the claims which follow.

We claim:

1. A composite structure comprising a layer of a solvent soluble polyurethane containing substantially no reactive isocyanate groups and being selected from the group consisting of polyesterurethanes, polyetherurethanes and polyesteramideurethanes adhered to a dissimilar surface selected from the group consisting of rubber, leather, wood, metal, ceramic and glass with an intercalated layer of a partial ester of polyacrylic acid anhydride.

2. A structure of claim 1 wherein the polyurethane is a polyesterurethane.

3. The structure of claim 1 wherein the polyurethane is a polyetherurethane.

4. The structure of claim 2 wherein the polyesterurethane is one which results from the transformation of the product of the esterification-condensation of a dicarboxylic acid conforming to the structure

HOOC—R—COOH wherein R represents a hydrocarbon group having from 2 to 12 carbon atoms with a glycol of the structure HO—R′—OH wherein R′ represents a hydrocarbon group having from 2 to 12 carbon atoms to a higher molecular weight polymer by the reaction of hydroxyl groups on said product with a diisocyanate of the structure OCN—R′′′—NCO wherein R′′′ represents a hydrocarbon group having from 2 to 14 carbon atoms.

5. The structure of claim 3 wherein the polyetherurethane is one comprising the reaction product of a hydroxyl terminated polyether of the structure HO(R″O)$_n$H wherein R″ represents an alkylene radical having from 2 to 12 carbon atoms and a diisocyanate of the structure OCN—R′′′—NCO wherein R′′′ represents a hydrocarbon group having from 2 to 14 carbon atoms.

6. The structure of claim 4 wherein the polyester has a molecular weight of from 400 to 4,000.

7. The structure of claim 5 wherein the polyether has a molecular weight of from 400 to 4,000.

8. The structure of claim 1 wherein the partial ester is the reaction product of linear polyacrylic acid anhydride and an aliphatic alcohol having from 1 to 6 carbon atoms.

9. The structure of claim 1 wherein one surface is a metal surface.

10. The structure of claim 1 wherein one surface is a ceramic surface.

11. The structure of claim 1 wherein one surface is glass.

12. A structure comprising a coating of the partial ethyl ester of linear polyacrylic acid anhydride upon an aluminum surface and a solvent soluble polyurethane containing substantially no reactive isocyanate groups and being selected from the group consisting of polyesterurethanes, polyetherurethanes and polyesteramideurethanes adhered to said coating.

13. A structure comprising a coating of the partial ethyl ester of linear polyacrylic acid anhydride upon a steel surface and a solvent soluble polyurethane containing substantially no reactive isocyanate groups and being selected from the group consisting of polyesterurethanes, polyetherurethanes and polyesteramideurethanes adhered to said coating.

14. A structure comprising a plate glass surface, a coating of the partial ethyl ester of linear polyacrylic acid anhydride upon said surface and a solvent soluble polyurethane containing substantially no reactive isocyanate groups and being selected from the group consisting of polyesterurethanes, polyetherurethanes and polyesteramideurethanes adhered to said coating.

15. A structure comprising a ceramic tile surface, a coating of the partial butyl ester of linear polyacrylic acid anhydride upon said surface and a solvent soluble polyurethane containing substantially no reactive isocyanate groups and being selected from the group consisting of polyesterurethanes, polyetherurethanes and polyesteramideurethanes adhered to the said coating.

16. A structure comprising a ceramic tile surface, a coating of the partial ethyl ester of linear polyacrylic anhydride upon said surface and a foamed solvent soluble polyurethane containing substantially no reactive isocyanate groups and being selected from the group consisting of polyesterurethanes, polyetherurethanes and polyesteramideurethanes adhered to said coating.

17. A method for preparing a composite structure of a solvent soluble polyurethane containing substantially no reactive isocyanate groups and being selected from the group consisting of polyesterurethanes, polyetherurethanes and polyesteramideurethanes adhered on at least one surface to a dissimilar surface selected from the group consisting of rubber, leather, wood, metal, ceramic and glass, said method comprising coating at least one of said surfaces with a solution of a partial ester of linear polyacrylic acid anhydride in an organic solvent, allowing said solvent to evaporate and adhering the coated surface to said dissimilar surface.

18. The method of claim 17 wherein the organic solvent is ethanol.

19. The method of claim 17 wherein the polyurethane is a polyesterurethane.

20. The method of claim 17 wherein the polyurethane is a polyetherurethane.

References Cited in the file of this patent

UNITED STATES PATENTS 2,430,479   Pratt et al. _____ Nov. 11, 1947

(Other references on following page)

UNITED STATES PATENTS

| | | |
|---|---|---|
| 2,445,535 | Parsons | July 20, 1948 |
| 2,639,252 | Simon et al. | May 19, 1953 |
| 2,649,439 | Brown | Aug. 18, 1953 |
| 2,650,212 | Windemuth | Aug. 25, 1953 |
| 2,718,516 | Bortnick | Sept. 20, 1955 |
| 2,740,743 | Pace | Apr. 3, 1956 |
| 2,753,642 | Sullivan | July 10, 1956 |
| 2,759,475 | Van Swaay | Aug. 21, 1956 |
| 2,778,283 | Bettoli | Jan. 27, 1957 |
| 2,851,448 | Slocombe | Sept. 9, 1958 |

OTHER REFERENCES

"Adhesive Bonding of Metals," by George Epstein, published in 1954 by Reinhold Publishing Corp., N.Y.C., N.Y., page 82 only.